Dec. 14, 1954    K. LUFT    2,696,731
MEASUREMENT OF THE PROPORTION OF A PARAMAGNETIC
GAS IN A GASEOUS MIXTURE
Filed July 27, 1949    2 Sheets-Sheet 1

INVENTOR
KARL LUFT,
BY
Robert B. Pearson
ATTORNEY

Dec. 14, 1954  K. LUFT  2,696,731
MEASUREMENT OF THE PROPORTION OF A PARAMAGNETIC
GAS IN A GASEOUS MIXTURE
Filed July 27, 1949  2 Sheets-Sheet 2

INVENTOR
KARL LUFT,
BY
Robert B. Pearson
ATTORNEY

United States Patent Office 2,696,731
Patented Dec. 14, 1954

2,696,731

MEASUREMENT OF THE PROPORTION OF A PARAMAGNETIC GAS IN A GASEOUS MIXTURE

Karl Luft, Toulouse, France, assignor to "Office National d'Etudes et de Recherches Aeronautiques" (O. N. E. R. A.), Paris, France, a society of France Application July 27, 1949, Serial No. 107,124

Claims priority, application France August 9, 1948

9 Claims. (Cl. 73—23)

The present invention relates to the measurement of the proportion of a paramagnetic gas, in particular oxygen, in a gaseous mixture or of the difference in the proportions of paramagnetic gas present in two gases, respectively, at least one of these gases being a gaseous mixture.

It is already known to determine the proportion of a paramagnetic gas in a gaseous mixture by subjecting this mixture to the action of a magnetic field of non uniform distribution and locally heating this mixture so that the magnetic susceptibility of the paramagnetic component of the mixture is different at the place of this local heating. But the measurement results thus obtained were often unsatisfactory because they were influenced by other factors than the contents of paramagnetic gas.

The object of this invention is to avoid this drawback and to permit accurate measurements of the kind above referred to, i. e. either of the proportion of paramagnetic gas in a gaseous mixture or of the difference between the proportions of paramagnetic gas in two gases at least one of which is a gaseous mixture.

Preferred embodiments of the present invention will be hereinafter described with reference to the accompanying drawings, given merely by way of example and in which.

Figure 1:
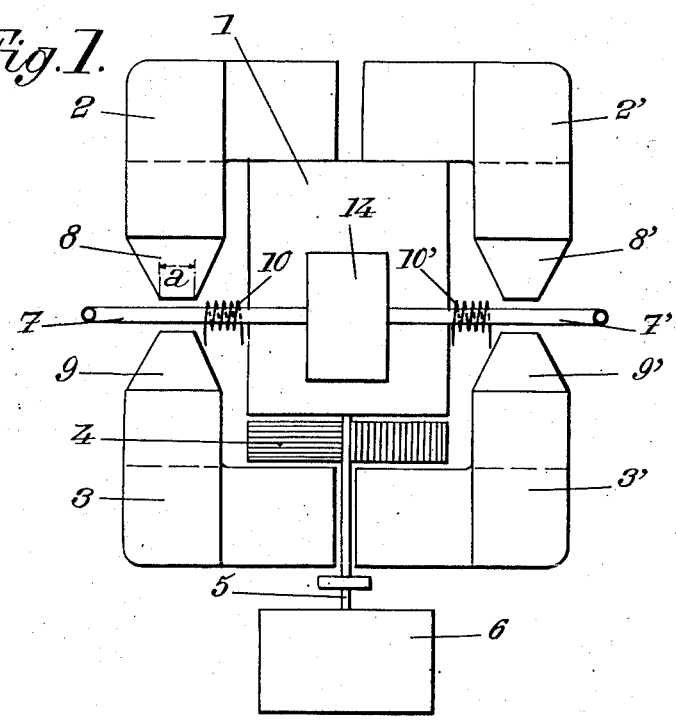
Fig. 1 is a diagrammatic elevational view of an apparatus according to the invention capable of determining the proportion of paramagnetic gas in a gaseous mixture, the tubes which contain this mixture being only partly shown.
Figure 2:
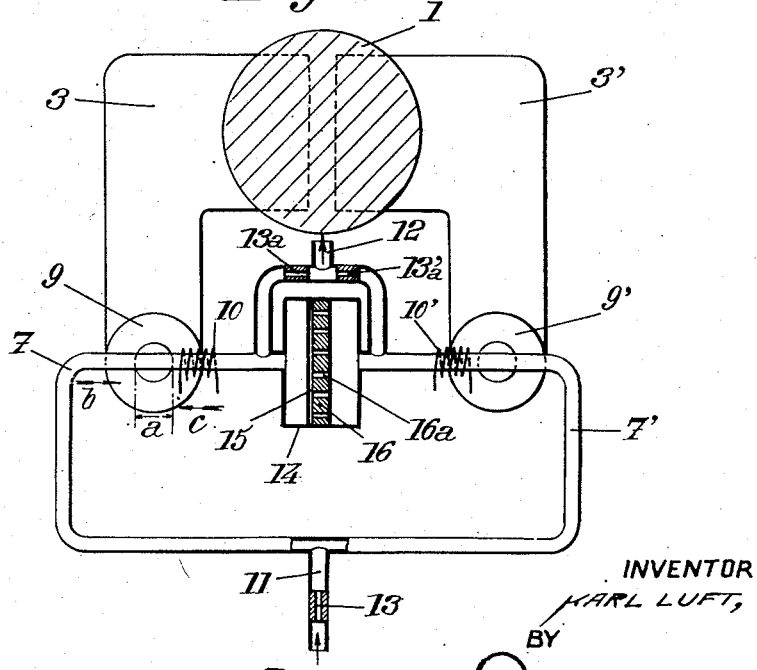
Fig. 2 is a plan view of the same apparatus, the upper pole pieces being removed.

In the embodiment shown by Figs. 1 and 2, a periodically varying magnetic field is optained by means of a permanent magnet the magnetic flux of which is controlled by a movable element interposed across the path of the magnetic flux of this magnet. Thus, I provide a permanent magnet 1 having at least two pole pieces 2 and 3 and I insert, between the permanent magnet 1 and at least one of the pole pieces, for instance pole piece 3, a rotary disc 4 partly made, for instance for the half thereof which is located on the left hand side of the drawing, of a magnetic metal, such as soft iron, whereas the other half is made of a non-magnetic material. When the soft iron half of disc 4 is the only one to be located between magnet 1 and pole piece 3, the magnetic flux can pass without substantial loss from magnet 1 to pole piece 3, whereas this flux is reduced and has only a value equal to a portion of its maximum value when the non-magnetic half of disc 4 is the only one to be located between magnet 1 and pole piece 3. In the intermediate positions of disc 4, for which variable portions of the two halves of this disc are located between magnet 1 and pole piece 3, the magnetic flux is more or less intensive. I thus obtain, owing to the rotation of disc 4, a periodical variation of the magnetic flux.

In order to cause disc 4 to rotate at the suitable frequency, for instance five revolutions per second, its shaft 5 is driven by any motor, for instance an electric motor 6. The tube 7 which contains the gaseous mixture to be examined is disposed in the air gap between the two ends 8 and 9 of the two pole pieces 2 and 3 and the portion of tube 7 which is located on one side of the air gap is heated through electric heating, for instance by means of a winding 10 extending over only a portion of tube 7, so as thus to produce a localized heating of the gaseous mixture contained in tube 7.

It is known that the magnetic susceptibility of paramagnetic gases depends upon their temperature and is the higher as the gas is colder.

End pieces 8 and 9 are preferably given a frusto-conical shape such as shown by Figs. 1 and 2. I thus obtain, in zone $a$, a uniform magnetic field, whereas on both sides of this zone $a$, the magnetic field is non uniform. It will be seen from the drawings that the zone of local heating is located on one side of zone $a$, that is to say in a zone where the magnetic field is non uniform. The gaseous masses present inside tube 7 in the non-uniform magnetic field portions are drawn toward zone $a$. However, this attraction is higher for the relatively cold gases, which are drawn in the direction of arrow $b$ than for the relatively hot gases heated by winding 10 which are drawn in the direction of arrow $c$. Therefore an unbalance is produced which creates a periodically variable overpressure in the portion of tube 7 which corresponds to the local heating. These overpressures are higher as the proportion of oxygen or another paramagnetic gas in the mixture located inside tube 7 is higher.

The width of the zone $a$ of the frusto-conical poles of the pole pieces is preferably chosen in such manner that the portion of tube 7 inside which the transition of temperature occurs is located in the uniform magnetic field.

Tube 7 is provided, at its inlet end 11 and its outlet 12, with capillary conduits 13 and 13$a$ which prevent the pressure variations obtained inside tube 7 under the influence of the periodically varying magnetic field from travelling to the outside, while permitting inflow and outflow of the gaseous mixture to be examined.

In order to measure the pressure variations that take place in tube 7, I may use any suitable device. Advantageously, the inside of this tube is connected with a chamber 14 provided with a diaphragm 15 which undergoes periodical deformations under the influence of the pressure variations that take place in tube 7.

This diaphragm 15 may constitute one of the electrodes of a diaphragm capacitor the other electrode 16 of which may be fixed. The variations of capacity of this capacitor due to deformations of diaphragm 15 are transformed, in a known manner, into voltage variations which, after amplification and rectification, are measured by means of a suitable instrument. The indications of this instrument directly give the proportion of paramagnetic gas, in particular oxygen, in tube 7.

It may be of interest to arrange the voltage variation amplifier as indicated in the French patent application Ser. No. 554,230 filed by the O. N. E. R. A. on April 29, 1948, for "Improvements to Apparatus for Quantitative Analysis, and in Particular That of Gaseous Mixtures."

Up to now I have mentioned only one pair of pole pieces for permanent magnet 1, forming a single air gap in which is placed the tube 7 which contains the gaseous mixture to be examined.

However, according to an embodiment which seems to be particularly advantageous, magnet 1 is provided with two pairs of pole pieces, one of these pairs being designated by 2 and 3 and the other by 2' and 3', the arrangement of these two pairs with respect to the main body of magnet 1 and with respect to rotary disc 4 being such that the periodically varying magnetic fields which are formed in the air gaps of these two pairs of pole pieces are in phase difference of 180°.

Furthermore, tube 7, between its inlet and outlet ends, is arranged in such manner as to form two symmetrical branches 7 and 7' each of which passes through one of these air gaps and is fitted with a heating device designated by 10 and 10' respectively. Each of these branches communicates with chamber 14 which, in this case, is divided by diaphragm 15 into two compartments one of which communicates with one of the branches and the other with the other branch. The electrode 16 present in one of these compartments is provided with channels 16a extending therethrough, which enable the pressure variations in this compartment of acting upon the corresponding face of diaphragm 15.

When the measurement apparatus is arranged as above described, each of the branches 7 and 7' is connected to the outlet 12 through a distinct capillary conduit designated by 13a and 13a' respectively, so as to prevent interaction of the pressures acting respectively upon opposite sides of diaphragm 15.

Operation of diaphragm 15 by pressure variations of the same amplitude and in phase difference of 180°, as obtained in the measurement apparatus which has just been described has the advantage of doubling the sensitiveness of the apparatus. Furthermore, this apparatus has the advantage of a symmetrical construction.

If it is desired to measure the difference between the proportions of oxygen or another paramagnetic gas in two different gaseous mixtures, this result can be obtained with an apparatus which differs but very little from that shown by Figs. 1 and 2. In this case also, the apparatus must be provided with two pole pieces. I place in the air gap between the first pair of pole pieces a tube containing one of the gaseous mixtures to be examined, whereas a tube containing the other gaseous mixture to be examined is placed in the air gap of the other pair of pole pieces, each of these tubes being provided laterally of the corresponding air gap, with a device ensuring a localized heating. In this last case, both tubes, contrary to what is shown by Figs. 1 and 2, are wholly separate from each other, each having its inlet and its outlet. However, they communicate, as shown by Fig. 2 for the two branches 7 and 7', with two compartments of a chamber 14 which are separated from each other by a common diaphragm. Finally, I proceed in such manner that the periodically varying magnetic fields between the two pairs of pole pieces are in phase instead of being out of phase. I then obtain movements of diaphragm 15 the amplitude of which directly indicates the difference between the proportions of paramagnetic gas present in the two gaseous mixtures to be compared.

Figure 3:
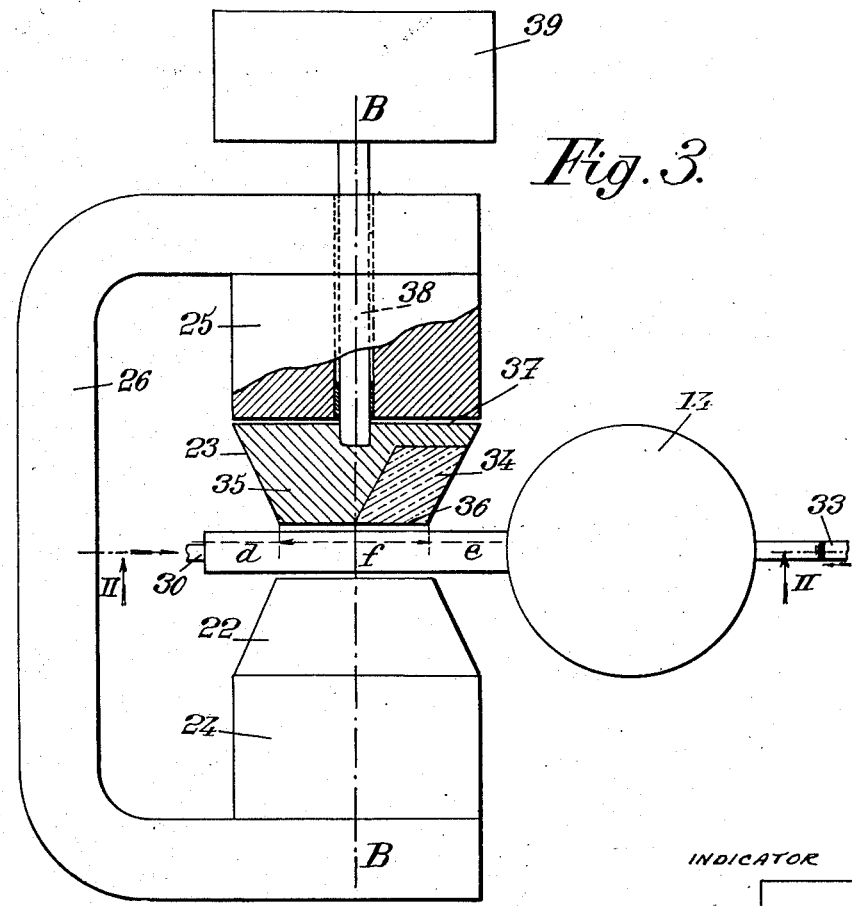
Fig. 3 is a diagrammatic elevational view of an apparatus for measuring the difference between the proportions of paramagnetic gas present in two gases, respectively.
Figure 4:
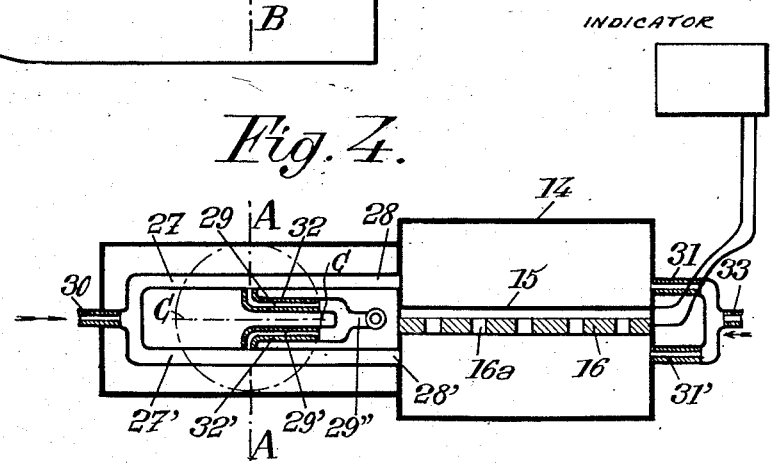
Fig. 4 is a section on the line IV—IV of Fig. 3 and shows in particular the arrangement of the gaseous circuits and their disposition with respect to the pole pieces.

In the embodiment illustrated by Figs. 3 and 4, I subject to the action of a magnetic field of non-uniform distribution and in which the intensity distribution is periodically varied the gases to be examined for measuring the difference between their respective contents in paramagnetic gas, these gases circulating for instance in tubes disposed between the pole pieces 22 and 23 of a magnetic circuit advantageously constituted by two permanent magnets 24 and 25 and a magnetic yoke 26.

According to the invention, the circuits of the gases to be examined are arranged in such manner that each of these circuits is disposed asymmetrically with respect to the magnetic field and the difference of the pressures thus produced in the two gases is caused to act upon an element capable of indicating this difference, for instance the diaphragm of a diaphragm condenser.

For instance, one of the gases to be examined is supplied through a tube 27, having its inlet on the left hand side and located in the interval between pole pieces 22 and 23, and the other gas is supplied through a tube 28 located in said interval and having its inlet on the opposite side, both tubes being of the same diameter and length inside at least most of the magnetic field which exists between the two pole pieces.

In the example shown by Figs. 3 and 4, tubes 27 and 28 are coaxial and both extend into the magnetic field as far as the plane A—A which passes through the vertical axis B—B of the pole pieces of the electro-magnets and which is perpendicular to the common axis of tubes 27 and 28.

The first of the two gases enters tube 27 through a capillary conduit 30 and the other gas enters tube 28 through a capillary conduit 33. The gases to be examined, which flow through tubes 27 and 28 in opposed directions, respectively escape through a conduit 29 which communicates with both of these tubes 27 and 28 in the region of plane A—A and which is subjected to the action of a vacuum so that the gases arriving through tubes 27—28 are evacuated together and under the same conditions of pressure through this outlet conduit 29.

This outlet conduit 29 also includes a capillary portion 32 which, together with the capillary portions 30 and 33 provided in the gas inlet conduits, permits circulation of the gases to be examined while maintaining, inside the apparatus, the useful effects of the pressure variations the measurement of which permits of determining the ratio to each other of the proportions of paramagnetic gases, for instance oxygen, in the two gases in question.

This measurement is carried out by means of a diaphragm capacitor the alternating variations of capacity of which are transformed into variations of voltage and measured preferably after amplification in a suitable measurement instrument. This capacitor is enclosed in a casing 14, at least one of the faces of the diaphragm 15 of this capacitor being exposed to the action of the alternating pressure variations that are produced.

Advantageously, this diaphragm is mounted in a casing 14 which is interposed, outside of the magnetic field, in the stream of one of the two gases to be examined, for instance in the gas stream which arrives through 33 and flows through tube 28. In view of the fact that tubes 27 and 28 are constantly in communication with each other, there exist, in the portion of casing 14 through which flows the stream of one of these gases, pressure variations which are equal to the difference between the instantaneous pressures to which the two gases to be examined are subjected under the action of the periodically varying magnetic field.

Besides, it is advantageous, in order to double the sensitivity of the apparatus, to establish for each of the gases two circuits substantially symmetrical to each other and to connect these circuits respectively with one and the other of the compartments which are located on either side of diaphragm 15.

For this purpose, the apparatus is provided with tubes 27', 28' and 29' symmetrically disposed with respect to tubes 27, 28 and 29. Besides, tubes 27 and 27' both start from capillary conduit 30.

Concerning tubes 28 and 28', they are also fed from the common capillary conduit 33 and I interpose, between inlet conduit 33 and the two compartments that are located inside casing 14, on either side of diaphragm 15 and through each of which passes one of the streams which flow toward tubes 28 and 28', other capillary tubes 31 and 31' which are intended to prevent the variations of pressure that take place in one of these compartments from acting upon pressure variations taking place in the other compartment.

Concerning the two outlet conduits 29 and 29', they are advantageously connected with the same source of vacuum through a conduit 29".

As already stated, the above mentioned diaphragm 15 advantageously belongs to a diaphragm capacitor. In this case, diaphragm 15 constitutes one of the electrodes of the capacitor, whereas the other electrode 16 which is located opposite diaphragm 15, in one of the two compartments of casing 14, is provided with apertures 16a which enable the pressure variations taking place in this compartment to act upon the corresponding face of diaphragm 15.

In order to obtain the pressure variations in the gases to be examined and which have, owing to their different percentages of paramagnetic gas, different magnetic susceptibilities, the magnetic field in the interval between pole pieces 22 and 23 must be a periodically variable field. Advantageously, in order to obtain these periodical variations, according to another feature of the invention, one of the pole pieces 22 or 23 is in the form of a rotary piece including at least one portion 34 having a very low and even no magnetic characteristics (practically non magnetic portion) and another portion 35 having high magnetic characteristics (magnetic portion). When there is only one non magnetic portion and one magnetic portion, it is advantageous to give these two portions a shape such that the face 36 of the rotary pole piece which is located opposite tubes 27, 27', 28, 28' is constituted by a magnetic semi-circle and a non magnetic semi-circle, the line of separation between the magnetic and non magnetic areas being a diameter of face 36.

When pole piece 23 is of frusto-conical shape, the non magnetic portion 34 is advantageously given the shape of a parallelogram in axial section, as shown by Fig. 3.

Furthermore, it is advantageous to provide the housing of the non magnetic portion 34 in the magnetic portion 35 so that the section 37 of said pole mass located opposite the permanent magnet is wholly made of magnetic metal.

The rotary polar mass, which is supposed in this case to be mass 23, is driven by means of a shaft or the like 38 which passes through mass 25 and is driven by a motor 39. The modulating of the magnetic field by means of said rotary pole piece has the advantage of permitting relatively important degree of modulation of the pressures without changing the reluctance of the magnetic circuit itself, which makes it possible to use a motor 39 of relatively low power.

The operation of the above described apparatus is as follows:

When the diametral line which, on face 36, separates from each other the two portions 34, 35 of pole piece 23 is in position C—C, and supposing that it is then the magnetic portion of this polar section which is located opposite tubes 27 and 28, the field acting on these two tubes is maximum. Consequently, each of the two gases tends to move from zones $d$ and $e$, where the field is lower, toward zone $f$ where the field is maximum.

If the proportions of paramagnetic gas are different in the two gases, there is produced a differential pressure which depends upon the difference between the portions of paramagnetic gas and which acts upon diaphragm 15.

A differential pressure of the same nature but much lower takes place between tubes 27' and 28' which are located chiefly opposite the non magnetic portion 34 of the rotary pole piece.

Diaphragm 15 therefore undergoes a pressure resulting from the difference between said two differential pressures.

When the pole piece rotates through 180°, the resultant pressure which acts upon diaphragm 15 is inverted. The diaphragm therefore undergoes periodical deformations the amplitude of which depends upon the difference between the proportions of paramagnetic gas in the two gases flowing on the one hand through tubes 27, 27' and on the other hand through tubes 28, 28'. These deformations produce variations of capacity of the capacitor constituted by elements 15 and 16, which variations are transformed in the known manner into variations of voltage. These last mentioned variations, after amplification and rectification, are measured by means of a suitable instrument the indications of which permit of determining the difference between the proportions of paramagnetic gas, in particular oxygen, in the two gases to be studied.

In order to obtain an exact measurement of the differences between the proportions of paramagnetic gas, it is necessary to prevent mutual diffusion of the two gases to be studied, which might take place in tubes 27 and 28, 27' and 28', in the vicinity of plane A—A, from going beyond zone $f$. For this purpose, the rate of flow of the two gases is suitably adjusted to limit the unavoidable interdiffusion between the two gases to said zone $f$.

I might also, according to a modification, separate the two gases, near discharge tubes 29 and 29', by a fluid-tight flexible diaphragm which would transmit the pressures while avoiding diffusion.

The embodiment according to Figs. 3 and 4 has many advantages which consist, among others, in its simplicity, which is increased by the elimination of any heating device and in the accuracy of these indications.

The symmetrical apparatus protected by capillary tubes 30, 31, 32, 33, is practically independent of external pressure variations.

Among the many applications which may be given to an apparatus of this kind, I will cite in particular: the measurement of the percentage of oxygen in a combustion gas before and after combustion; the measurement of the purity of oxygen manufactured through various methods, by comparison with oxygen of given purity, the measurement of oxygen retained by a living organism in the course of an inspiration, by comparing the inspired and expired air, etc.

Of course the apparatus according to the embodiment of Figs. 3 and 4 could be applied to the absolute measurements of the proportion of paramagnetic gas in a gaseous mixture, by comparing this mixture with pure oxygen or with another mixture in which the proportion of paramagnetic gas is known, and is for instance equal to zero.

The paramagnetic gas to be measured in a gaseous mixture may consist of nitrogen oxide and the diaphragm measurement device instead of being constituted by an electrostatic microphone as described might be an electromagnetic microphone.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus of the type described which comprises, in combination, means for producing a periodically varying magnetic field of non uniform distribution, means locating two communicating masses of a paramagnetic gas in said magnetic field, means for inducing a different magnetic susceptibility in one of said masses, and means for measuring the periodical variations of the pressure difference between these two masses.

2. An apparatus for measuring the proportion of a paramagnetic gas in a gaseous mixture which comprises, in combination, means for producing a periodically varying magnetic field of non uniform distribution, means for subjecting a mass of said mixture to the action of said field, means for locally heating a portion of said mass on one side of said field and means for measuring the periodical variations of the pressure difference between this portion of the gaseous mass and another portion thereof.

3. An apparatus for measuring the difference between the proportions of paramagnetic gas present in two respective gases at least one of which is a gaseous mixture which apparatus comprises, in combination, means for producing a periodically varying magnetic field of non uniform distribution, means for disymmetrically disposing in said field two communicating masses of said respective gases, each of said gaseous masses extending over an area of the filed where the field intensity is non-uniformly distributed, whereby each of said masses tends to have a displacement with respect to the location where the gaseous masses are in communication, and means for measuring the periodical variations of the pressure difference between said two masses.

4. An apparatus for measuring the proportion of a paramagnetic gas in a gaseous mixture which comprises, in combination, means for producing a periodically varying magnetic field of non uniform distribution, a tube extending through said field, means for feeding said mixture to said tube, means for locally heating a portion of said tube on one side of said field and means for measuring the periodical variations of the pressure in said tube.

5. An apparatus for measuring the difference between the proportions of paramagnetic gas present in two respective gases at least one of which is a gaseous mixture, which apparatus comprises, in combination, means for producing a periodically varying magnetic field of non uniform distribution, two communicating tubes extending in opposed directions in said field, means for feeding said respective gases to said tubes in such manner that the two gases are in communication with each other, and each gas is in different strength parts of the field simultaneously whereby each of said gases tends to have a displacement with respect to the location where the gases are in communication, and means for measuring the periodical variations of the difference between the respective pressures in said tubes.

6. An apparatus of the type described which comprises, in combination, a permanent magnet having at least one air gap, moving means interposed across the path of the magnetic flux of this magnet for varying periodically the magnetic field in said air gap, means locating two communicating masses of a paramagnetic gas in said air-gap, means for inducing a different magnetic susceptibility in one of said masses, and means for measuring the periodical variations of the pressure difference between these two masses.

7. An apparatus according to claim 6 in which said moving means consist of a disc having one half made of a magnetic metal and the other half of a non-magnetic metal, said disc being disposed transversely to the path of the magnetic flux of said magnet and with one half of its section across said path.

8. An apparatus of the type described which comprises, in combination, a permanent magnet having two pole pieces forming an air gap between them, one of said pole pieces being rotatable about an axis at right angles to the general direction of said air gap, this pole piece including two portions of different magnetic characteristics disposed each disymmetrically with respect to said axis of rotation, means for rotating said pole piece, means for subjecting two masses of gas of different magnetic susceptibilities respectively to the actions of parts of field between said pole pieces located on either side of said air gap and means for measuring the periodical variations of the pressure difference between said masses.

9. An apparatus for measuring the difference between the proportions of paramagnetic gas present in two respective gases, which comprises, in combination, a permanent magnet having at least one air gap, moving means interposed across the path of the magnetic flux of said magnet for periodically varying the magnetic field in said air gap, means for disymmetrically disposing in said field two masses of said respective gases and means for measuring the periodical variations of the pressure difference between these two masses.

References Cited in the file of this patent

UNITED STATES PATENTS

| Number | Name | Date |
|---|---|---|
| 2,263,335 | Heinz | Nov. 18, 1941 |
| 2,416,344 | Pauling | Feb. 25, 1947 |

FOREIGN PATENTS

| Number | Country | Date |
|---|---|---|
| 712,762 | Germany | Oct. 24, 1941 |
| 724,041 | Germany | Aug. 17, 1942 |